United States Patent
Miyashita

(10) Patent No.: US 10,671,898 B2
(45) Date of Patent: Jun. 2, 2020

(54) TAPE CASSETTE AND PRINTING APPARATUS

(71) Applicant: BROTHER KOGYO KABUSHIKI KAISHA, Nagoya, Aichi (JP)

(72) Inventor: Tomoki Miyashita, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 172 days.

(21) Appl. No.: 15/713,873

(22) Filed: Sep. 25, 2017

(65) Prior Publication Data
US 2018/0276512 A1 Sep. 27, 2018

(30) Foreign Application Priority Data
Mar. 24, 2017 (JP) .................................. 2017-058921

(51) Int. Cl.
| | |
|---|---|
| G06K 15/02 | (2006.01) |
| B41J 3/407 | (2006.01) |
| B41J 3/50 | (2006.01) |
| B41J 15/04 | (2006.01) |

(52) U.S. Cl.
CPC ........ *G06K 15/1859* (2013.01); *B41J 3/4075* (2013.01); *B41J 3/50* (2013.01); *B41J 15/044* (2013.01); *G06K 15/183* (2013.01); *G06K 15/1828* (2013.01); *G06K 2215/0037* (2013.01)

(58) Field of Classification Search
CPC ........... G06K 15/1859; G06K 15/1828; G06K 15/183; G06K 15/22; G06K 15/0037; B41J 3/4075; B41J 3/50; B41J 15/044; B41J 32/00
See application file for complete search history.

(56) References Cited

U.S. PATENT DOCUMENTS 5,609,424 A * 3/1997 Sakuragi ................ B41J 3/4075 400/61
5,688,056 A 11/1997 Peyret
6,182,565 B1 * 2/2001 Takayama ................ B41J 3/407 101/35

(Continued)

FOREIGN PATENT DOCUMENTS

| JP | H09-501520 A | 2/1997 |
|---|---|---|
| JP | H09-265366 A | 10/1997 |

(Continued)

*Primary Examiner* — David H Banh
(74) *Attorney, Agent, or Firm* — Scully Scott Murphy and Presser

(57) ABSTRACT

A printing apparatus to print a character in conjunction with a tape cassette is provided. The tape cassette includes a tape and a first memory device to store character data. The printing apparatus includes an attachable section, a second memory device, a controller, and a printer. The controller reads specific character data that satisfies a predetermined condition from the first memory device in the tape cassette, stores the specific character data in the second memory device as in-apparatus stored data, and appoints print-object data being the character data corresponding to an object character, which is the character appointed as a print object, from the in-apparatus stored data in the second memory device. The printer prints the object character on the tape in the tape cassette based on the appointed print-object data.

11 Claims, 13 Drawing Sheets

(56) References Cited

U.S. PATENT DOCUMENTS

| | | | |
|---|---|---|---|
| 6,370,318 B1 | 4/2002 | Iwaki | |
| 8,554,958 B1* | 10/2013 | Weiser | B41J 2/17546 |
| | | | 347/19 |
| 2002/0015495 A1 | 2/2002 | Kageyama et al. | |
| 2007/0201934 A1* | 8/2007 | Ito | B41J 3/4075 |
| | | | 400/615.2 |
| 2008/0181703 A1* | 7/2008 | Ito | B41J 3/4075 |
| | | | 400/61 |
| 2008/0247798 A1* | 10/2008 | Buzuev | B41J 3/4075 |
| | | | 400/67 |

FOREIGN PATENT DOCUMENTS

| | | |
|---|---|---|
| JP | H10-222497 A | 8/1998 |
| JP | H11-136622 A | 5/1999 |
| JP | 2001-60196 A | 3/2001 |
| JP | 2001-105625 A | 4/2001 |
| JP | 2002-56605 A | 2/2002 |
| JP | 2008-77443 A | 4/2008 |
| JP | 2008-80668 A | 4/2008 |
| JP | 2011-37029 A | 2/2011 |

* cited by examiner

TAPE CASSETTE AND PRINTING APPARATUS

CROSS REFERENCE TO RELATED APPLICATION

This application claims priority from Japanese Patent Application No. 2017-058921, filed on Mar. 24, 2017, the entire subject matter of which is incorporated herein by reference.

BACKGROUND

Technical Field

An aspect of the present disclosure is related to a tape cassette and a printing apparatus.

Related Art

A printing apparatus and a cassette, e.g., a tape cassette, having a memory device, e.g., an IC tag, are known. The printing apparatus may read information from the IC tag in the tape cassette when the tape cassette is attached to the printing apparatus. The IC tag may store information concerning, for example, a type of the tape cassette and products to which adhesive labels produced in the printing apparatus may be attached.

For another example, an ink cartridge having an IC chip, in which cartridge information is stored, is known. The cartridge information may contain identifying information to identify a manufacturer of the ink cartridge, manufactured date, a model number, a name of the cartridge, a type of ink (e.g., black or multicolor). The printing apparatus may exchange data with the IC chip in the ink cartridge when the ink cartridge is attached to the printing apparatus.

SUMMARY

Meanwhile, the known printing apparatus may have a memory device to store units of standard character data, i.e., so-called built-in fonts, to print characters in a style on a strip of tape in a tape cassette. The character data may include information concerning a language, a name of the font, character codes, and print-form data. The print-form data may indicate printed figures of the characters in compliance with resolutions available in the printing apparatus. The printing apparatus may print the characters on the tape based on the built-in fonts.

In this regard, however, the printing apparatus may not be capable of printing some characters specifically optimized to the tape cassette on the tape due to, for example, a type or a purpose of the tape cassette. For example, when the tape cassette has a tape with an uncommon width, which is not compliant with the build-in font in the printing apparatus, the printing apparatus may not be capable of printing the characters in a printing size corresponding to the uncommon width. For another example, when a character to be printed on the tape is an uncommon character that is not included in the built-in fonts, the printing apparatus may not be capable of printing the uncommon character.

The present disclosure is advantageous in that a printing apparatus, in which characters may be printed on a tape in a form suited for a type or a purpose of a tape cassette, is provided.

According to an aspect of the present disclosure, a tape cassette, to which at least one of a type and a purpose is assigned, is provided. The tape cassette includes a tape being a printing medium; and a first memory device configured to store information to be readable. The information includes character data being a data unit for printing a character on the tape. The character data includes specific character data for printing a specific character, which is expressed in a specific format in compliance with the at least one of the type and the purpose assigned to the tape cassette.

According to another aspect of the present disclosure, a printing apparatus configured to print a character in conjunction with a tape cassette, to which at least one of a type and a purpose is assigned, is provided. The tape cassette includes a tape being a printing medium and a first memory device configured to store information including character data being a data unit for printing the character on the tape. The character data includes specific character data for printing a specific character which is expressed in a specific format in compliance with the at least one of the type and the purpose assigned to the tape cassette. The printing apparatus includes an attachable section, to which the tape cassette is detachably attached; a second memory device configured to store built-in data being the character data for printing the character in a predetermined format as in-apparatus stored data; a controller, and a printer. The controller is configured to read the specific character data that satisfies a predetermined condition from the first memory device in the tape cassette being attached to the attachable section and store the read specific character data in the second memory device as the in-apparatus stored data; and appoint print-object data being the character data corresponding to an object character, the object character being the character appointed as a print object, from the in-apparatus stored data stored in the second memory device. The printer is configured to print the object character on the tape in the tape cassette being attached to the attachable section based on the appointed print-object data.

BRIEF DESCRIPTION OF THE ACCOMPANYING DRAWINGS

DETAILED DESCRIPTION

A printing apparatus 1 according to an embodiment of the present disclosure will be described below with reference to the accompanying drawings. First, referring to FIGS. 1 and 2, a mechanical configuration of the printing apparatus 1 will be described. The printing apparatus 1 may print text including characters, e.g., symbols, numeric signs, figures, icons, etc., on a strip of tape 50 (see FIG. 2) to produce labels. In the following description, concerning orientation of the image forming apparatus 1, a viewer's upper-right side, a lower-left side, a lower-right side, an upper-left side, an upper side, and a lower side shown in FIG. 1 will be referred to as a rightward side, a leftward side, a frontward side, a rearward side, an upper side, and a lower side of the image forming apparatus 1, respectively.

Figure 1:
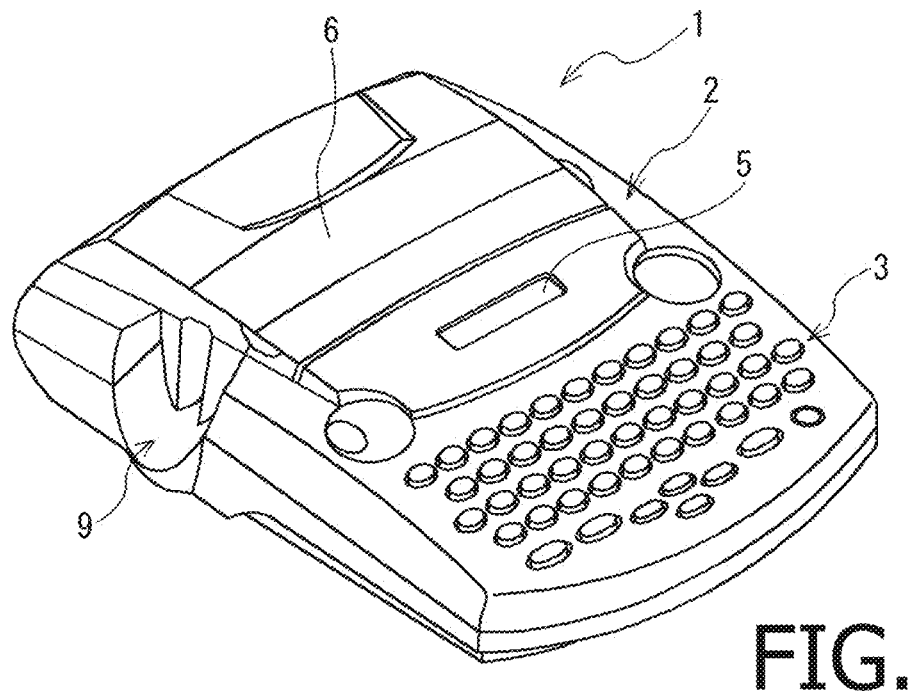
FIG. 1 is a perspective view of a printing apparatus according to an embodiment of the present disclosure.

As shown in FIG. 1, the printing apparatus 1 includes a main cover 2 being a housing that has an approximately rectangular shape. In a frontward area on an upper surface of the main cover 2, arranged is a keyboard 3, through which characters may be input. The keyboard 3 may include, for example, a power switch, function keys, and cursor keys. In a rearward position from the keyboard 3, arranged is a display 5, in which various types of information may be displayed. The display 5 may be, for example, a dot-matrix liquid crystal display (LCD). In a rearward area from the display 5, arranged is a cassette cover 6, which is openable/closable with respect to the main cover 2. In a rearward position on a leftward face of the main cover 2, arranged is a tape outlet 9. The tape outlet 9 is an opening, through which the tape 50 with characters printed thereon may be ejected.

Figure 2:
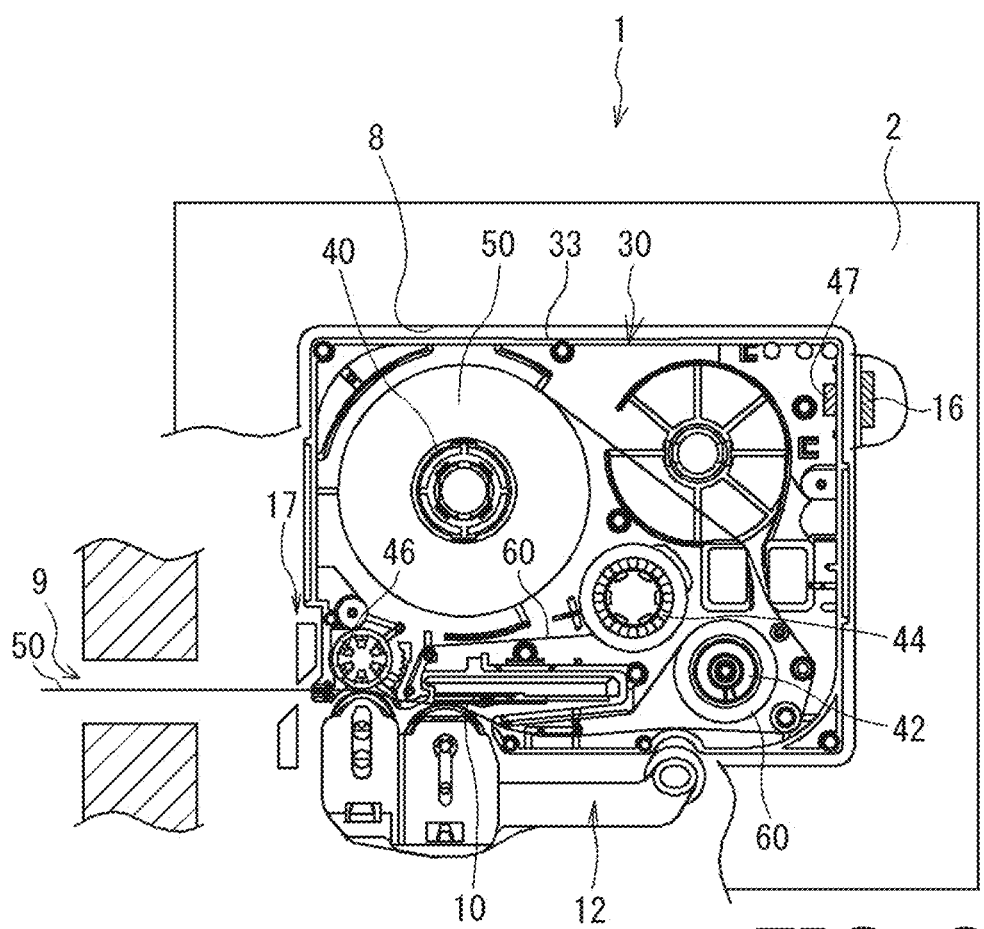
FIG. 2 is a partial plan view of the printing apparatus with a cassette cover being open according to the embodiment of the present disclosure.

As shown in FIG. 2, inside the main cover 2, underneath the cassette cover 6 (see FIG. 1), arranged is an attachable section 8. The attachable section 8 is formed to dent in a shape to accommodate a tape cassette 30 so that the tape cassette 30 may be detachably attached thereto. In the following description, the tape cassette 30 attached to the attachable section 8 will be referred to as an attached tape cassette 30. In conjunction with the attached tape cassette 30, the printing apparatus 1 may print characters that are input through the keyboard 3 on the tape 50.

The tape cassette 30 includes a cassette casing 33 being a housing formed in an approximate shape of a box to accommodate the tape 50 and an ink ribbon 60. In a leftward-rear area in the tape cassette 30, a tape spool 40, around which the tape 50 in an unused condition may be wound, is rotatably supported. In a rightward front area in the tape cassette 30, a ribbon spool 42, around which the ink ribbon 60 in an unused condition may be wound, is rotatably supported. In a position between the tape spool 40 and the ribbon spool 42, a ribbon-collector spool 44 is rotatably supported. The ribbon-collector spool 44 may draw the unused ink ribbon 60 from the ribbon spool 42 and wind the ink ribbon 60 in a used condition there-around. At a leftward-front corner in the tape cassette 30, a tape-driving roller 46, which may draw the unused tape 50 from the tape spool 40, is rotatably supported.

On the tape cassette 30, mounted is an IC tag 47, from which data may be at least read. The IC tag 47 is arranged at a rightward-rear corner in the cassette casing 33. The IC tag 47 may store in-cassette external data 83 (see FIG. 5), which will be described later in detail.

In the attachable section 8, arranged are a ribbon-collector shaft (not shown), a tape-driver shaft (not shown), a thermal head 10, a platen 12, and a data reader/writer 16. The ribbon-collector shaft is inserted through the ribbon-collector spool 44 and is rotatable by a driving force from a tape-feed motor 23 (see FIG. 3). The tape-driver shaft is inserted through the tape-driver roller 46 and is rotatable by the driving force from the tape-feed motor 23 through a transmission (not shown). The thermal head 10 is arranged on a rightward side of the tape-driver shaft and may print characters on the tape 50 being conveyed in conjunction with the unused ink ribbon. The platen 12 may, together with the thermal head 10, press the tape 50 and the ink ribbon 60 against each other and convey the tape 50 and the ink ribbon 60 integrally.

The data reader/writer 16 is arranged in a rightward-rear area in the attachable section 8 at a position to coincide with the IC tag 47 in the attached tape cassette 30 across a right-side wall of the cassette casing 33. The data reader/writer 16 may write and read data to and from the IC tag 47 in the attached tape cassette 30 in RFID technology.

A cutter assembly 17 may be arranged in vicinity of the tape outlet 9. The cutter assembly 17 may be driven by a driving force from a cutter motor 24 (see FIG. 3) to cut the tape 50 at a predetermined position.

Figure 3:
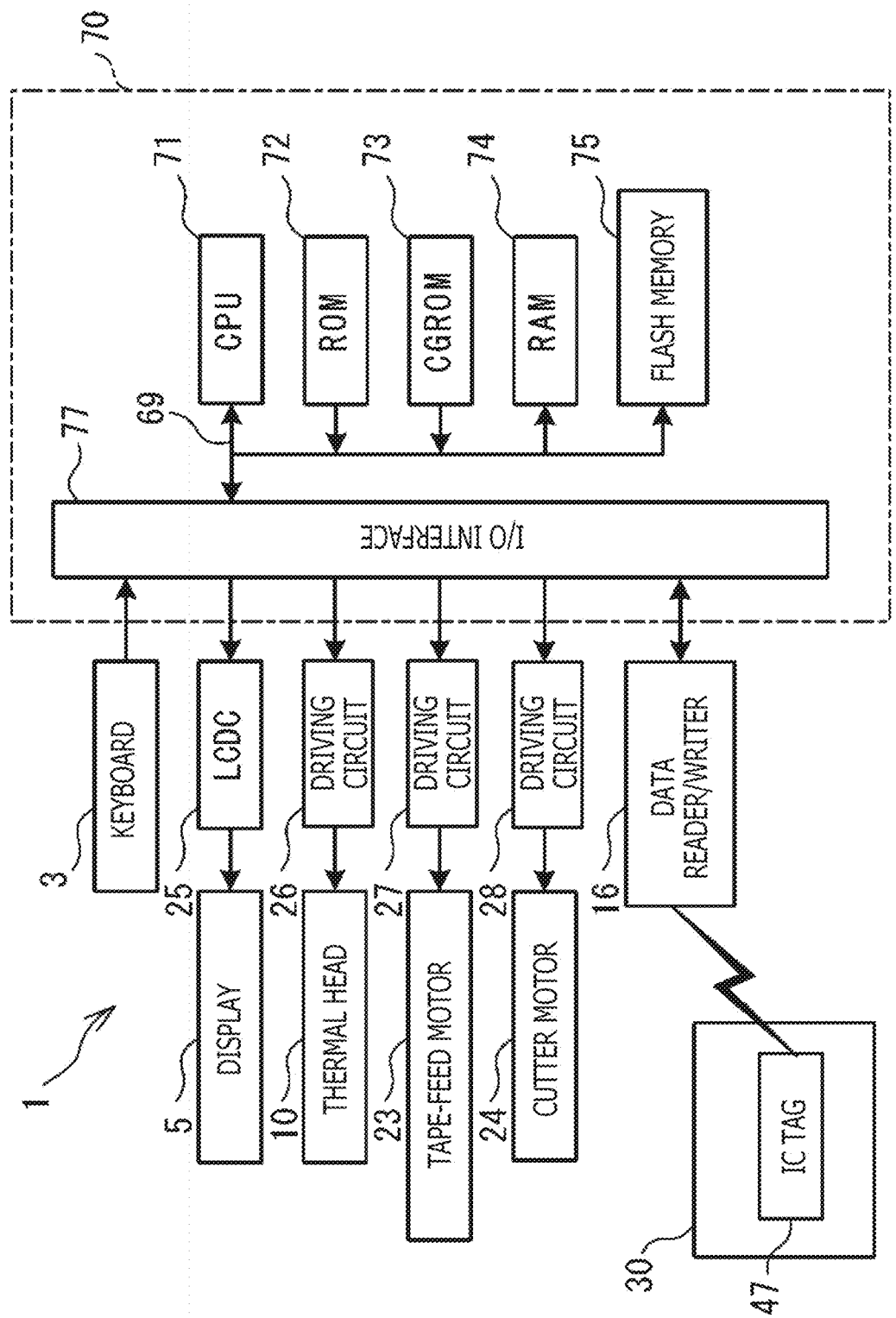
FIG. 3 is a block diagram to illustrate an electrical configuration of the printing apparatus according to the embodiment of the present disclosure.

An electrical configuration of the printing apparatus 1 will be described below with reference to FIGS. 3 and 4. As shown in FIG. 3, the printing apparatus 1 includes a controller circuit unit 70. The controller circuit unit 70 includes a CPU 71, a ROM 72, a CGROM 73, a RAM 74, a flash memory 75, and an input/output (JO) interface 77, which are connected with one another through a data bus 69.

The CPU 71 may control overall acts in the printing apparatus 1. The ROM 72 may store various types of parameters that are required for programs to be executed by the CPU 71. The CGROM 73 may store built-in fonts 81, which will be described in detail later. The RAM 74 contains a plurality of memory areas including a text memory and a printer buffer. The flash memory 75 may store the programs to be executed by the CPU 71 to control the printing apparatus 1 and in-printer external data 82, which will be described later in detail.

The IO interface 77 is connected with the keyboard 3, a liquid crystal driving circuit (LCDC) 25, driving circuits 26, 27, 28, and the data reader/writer 16. The LCDC 25 includes a video RAM (not shown), which may be used to output data to the display 5. The driving circuit 26 is an electric circuit to drive the thermal head 10. The driving circuit 27 is an electric circuit to drive the tape-feed motor 23. The driving circuit 28 is an electric circuit to drive the cutter motor 24.

Figure 4:
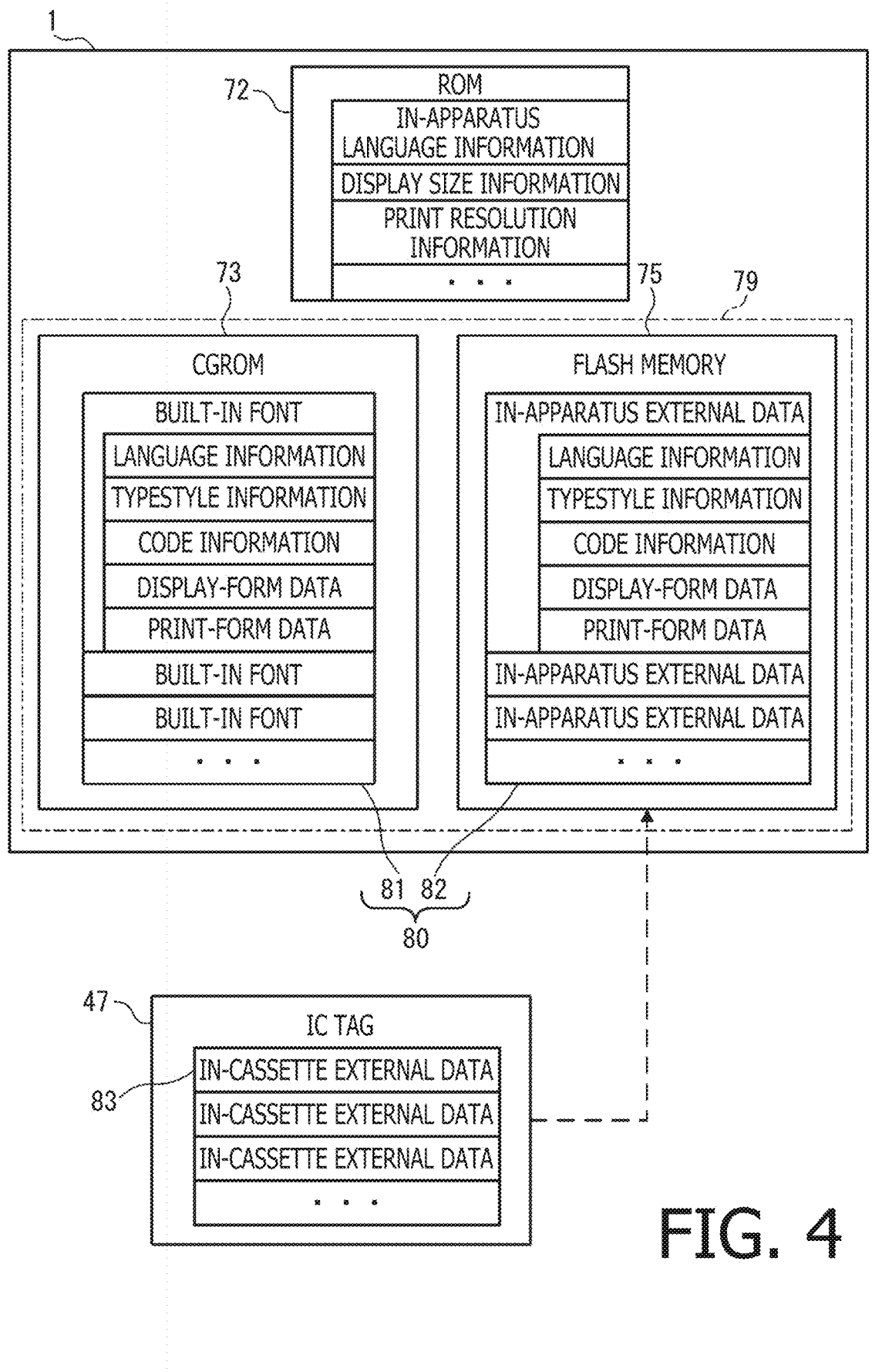
FIG. 4 illustrates of structures of data to be stored in the printing apparatus according to the embodiment of the present disclosure.

As shown in FIG. 4, the ROM 72 may store data including in-apparatus language information, display size information, and print resolution information. The in-apparatus language information indicates an operable language, which is a language of characters opearble in the printing apparatus 1 and may be, for example, Japanese. The display size information indicates a displaying size, e.g., a dot rate of characters in a displayed form. The display size may be defined in advance in compliance with display specifications, e.g., a size of a screen and a displayable resolution, of the printing apparatus 1. The print resolution information indicates a resolution, e.g., a dot rate of characters in a printed form printed by the thermal head 10. The print resolution information may be, for example, 360 dpi.

The printing apparatus 1 may store character data, which is required in order to print each character on the tape 50. The character data includes built-in fonts 81 and in-apparatus external data 82. In the following description, the character data including the built-in fonts 81 and the in-apparatus external data 82 stored in the printing apparatus 1 may be collectively referred to as in-apparatus stored data 80. Meanwhile, a memory device to store the in-apparatus stored data 80 in the printing apparatus 1, e.g., the CGROM 73 to store the built-in fonts 81 and the flash memory 75 to store the in-apparatus external data 82, may be collectively referred to as an internal memory 79.

The built-in font 81 is a data unit to be used to print a character in a style compliant with the condition, e.g., the operable language and the printable resolution in the printing apparatus 1, of the printing apparatus 1. A plurality of built-in fonts 81 corresponding to a plurality of characters operable in the printing apparatus 1 may be installed to be stared in the CGROM 73 when, for example, the printing apparatus 1 is manufactured. Each data unit of built-in font 81 may include the language information, typestyle information, code information, display-form data, and print-form data for the corresponding character.

The language information indicates a language, to which the character may belong. The language information in the built-in font 81 indicates, similarly to the in-apparatus language information, the operable language. The typestyle information indicates a typestyle (e.g., Ming-style, gothic, etc.) applied to the character. The code information indicates a character code uniquely assigned to the character to identify the character. The display-form data indicates a dot pattern for the character to be displayed in the display 5. The print-form data in each built-in font 81 indicates a display dot pattern for the character corresponding to the display size information. The print-form data indicates a dot pattern for the character to be printed by the thermal head 10. The print-form data in each built-in font 81 indicates a print dot pattern to print the character corresponding to the print resolution information.

The in-apparatus external data 82 is a unit of external data stored in the printing apparatus 1 rather than in the tape cassette 30. The external data is the character data obtained externally from a device outside the printing apparatus 1. A plurality of units of in-apparatus external data 82 may be copied from the IC tag 47 and stored in the flash memory 75, as will be described later in detail. The externally obtained character data is therefore not identical with any of the built-in fonts 81 stored in the CGROM 73. A unit of in-apparatus external data 82 may include, similarly to a unit of built-in font 81, the language information, the typestyle information, the code information, the display-form data, and the print-form data for the corresponding character.

Separately from the internal memory 79, the in-cassette external data 83 is stored in the IC tag 47 in the tape cassette 30. A data structure of a unit of the in-cassette external data 83 will be described with reference to FIG. 5. The in-cassette external data 83 is a unit of external data stored in the tape cassette 30 rather than in the printing apparatus 1. A plurality of units of in-cassette external data 83 may be installed to be stored in the IC tag 47 when, for example, the tape cassette 30 is manufactured. The in-cassette external data 83 is a unit of character data required to print a specific character, which may be expressed in a specific format in compliance with a predetermined type and/or purpose assigned to the tape cassette 30.

The specific character may be, for example, a character to be printed on the tape 50 in a printing size adapted to a tape width which is specific to the tape cassette 30. For example, a width of the tape 50 in the tape cassette 30 may be uniquely larger or smaller than a standard width of the tape 50 that may be commonly usable in the printing apparatus 1. In this regard, the specific character is a character in a printing size which is adapted to a specific tape width, e.g., a character in a maximum printing size applicable to on a tape 50 with a unique width. The printing apparatus 1 may print the character in the printing size adapted to the unique tape width on the tape 50 based on the in-cassette external data 83 prepared in the IC tag 47.

The specific character may be, for another example, a character to be printed on the tape 50 in a printing size adapted to a printable area which is unique to the tape cassette 30. For example, the tape 50 in the tape cassette 30 may have a printable area defined therein, which is in a size capable of accepting a unique-sized character to be printed therein. The unique size may be, for example, a printing size that may not be used commonly or an intermediate printing size between standard printing sizes. In this regard, the specific character is a character that may be printed in a unique size. The printing apparatus 1 may print the unique-sized character to fit in the printable area based on the in-cassette external data 83 prepared in the IC tag 47.

The specific character may be, for another example, a unique character that has a figure adapted specifically to the type or purpose assigned to the tape cassette 30. For example, the tape cassette 30 may be a single-purposed tape cassette 30 manufactured specifically to produce labels to be applied to electric equipment. In this regard, the specific character may be symbols or icons that are uniquely used in the field of electric equipment. The printing apparatus 1 may produce the labels, on which the symbols or icons specific to field of electric equipment are printed, based on the in-cassette external data 83 prepared in the IC tag 47.

For another example, the tape cassette 30 may be a single-purposed tape cassette 30 manufactured specifically to produce content-thematic labels that have a motif related to a predetermined content, e.g., a movie, a cartoon film, a TV show, a pop-idol group, etc. In this regard, the specific character may include images of figures, animals, icons, and logos that appear in the content. The printing apparatus 1 may produce the labels, on which the images related to the content are printed, based on the in-cassette external data 83 prepared in the IC tag 47.

The specific character may be, for another example, a character to be printed on the tape 50 in a printing format adapted to a property of the tape 50. For example, the tape 50 in the tape cassette 30 may be made of a material, in which a printing medium tends to exude. If the characters are printed on the tape 50 with the exuding tendency in a regular printing thickness, visibility of the exuded characters on the produced labels may be lowered. In this regard, the specific character may include a character, which requires to be printed in thinner lines. The printing apparatus 1 may print the characters in thinner lines on the tape 50 with the exuding tendency, based on the in-cassette external data 83 prepared in the IC tag 47, to restrain the visibility of the characters from being lowered.

For another example, the tape 50 in the tape cassette 30 may be made of a material, in which a printing medium tends to coarsen. If the characters are printed on the tape 50 with the coarsening tendency in a regular printing thickness, visibility of the coarsened characters on the produced labels may be lowered. In this regard, the specific character may include a character, which requires to be printed in thicker lines. The printing apparatus 1 may print the characters in thicker lines on the tape 50 with the coarsening tendency, based on the in-cassette external data 83 in the IC tag 47, to restrain the visibility of the characters from being lowered.

Figure 5:
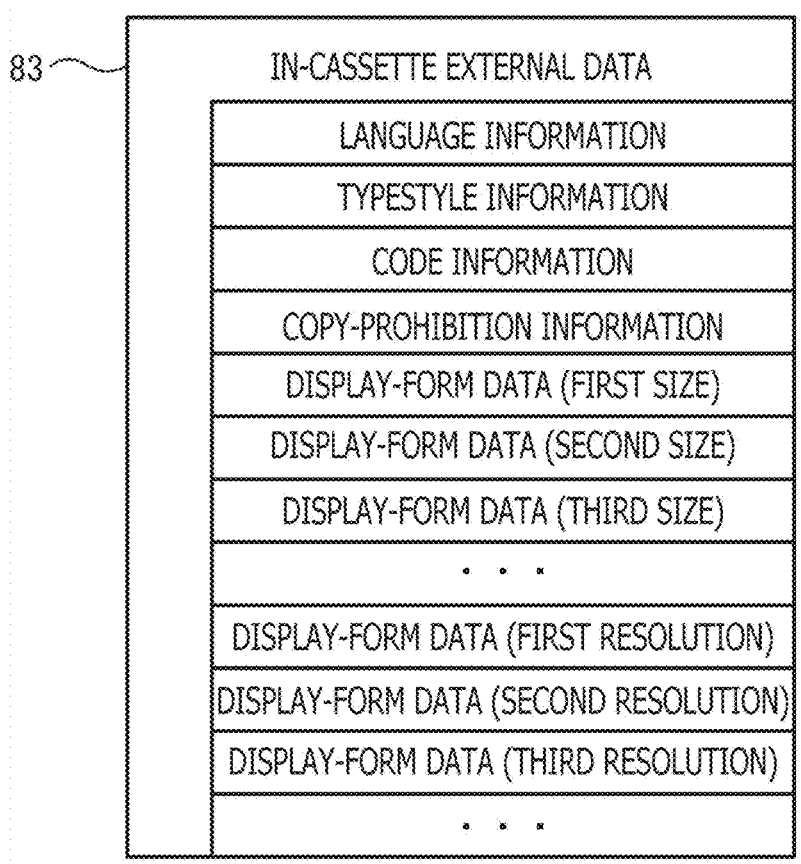
FIG. 5 illustrates a structure of in-cassette external data to be stored in a tape cassette according to the embodiment of the present disclosure.

As shown in FIG. 5, each unit of in-cassette external data 83 includes, similarly to a unit of built-in font 81, the language information, the typestyle information, and the code information for a character. The in-cassette external data 83 further includes copy-prohibition information, a plurality of units of display-form data, and plurality of units of print-form data. The copy-prohibition information is a flag being a unit of information set to the in-cassette external data 83 to allow or prohibit the in-cassette external data 83 from being copied and stored externally from the IC tag 47. When the copy-prohibition information indicates "on," the in-cassette external data 83 is prohibited from being copied to be stored in an external device. In other words, when the copy-prohibition information indicates "on," a prohibition flag is set to the in-cassette external data 82.

The display 5 is adapted to a predetermined one of a plurality of applicable displaying settings, and each unit of the display-form data in the in-cassette external data 83 is prepared to correspond to each one of the plurality of applicable displaying settings. For example, a display-form data for a first size may indicate a display dot pattern to display a character on the display 5 having a first-sized screen.

Figures 6A, 6B:
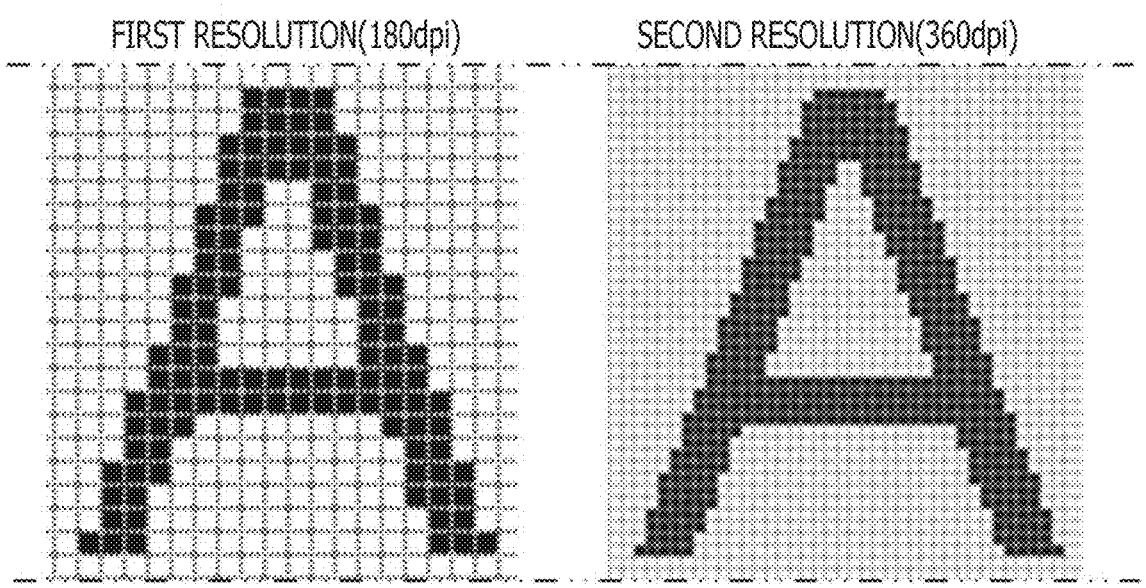
FIGS. 6A-6B are illustrative views of a character in different resolutions in the printing apparatus according to the embodiment of the present disclosure.

The thermal head 10 is adapted to a predetermined one of a plurality of applicable print resolutions depending on a condition, e.g., a model, of the printing apparatus 1, and each unit of the print-form data in the in-cassette external data 83 is prepared to correspond to each one of the plurality of applicable print resolutions. For example, a unit of print-form data for a first resolution may indicate a print dot pattern for a character to be printed by the thermal head 10 adapted to the first resolution. FIGS. 6A and 6B illustrate a character "A" printed on a tape 50 having a same width in different resolutions. The character "A" in FIG. 6A and the character "A" in FIG. 6B are identified by a same code and printed in a same size but printed in different resolutions, that is, a first resolution, e.g., 180 dpi, and in a second resolution, e.g., 360 dpi, respectively.

In the following paragraphs, referring to FIGS. 7-18, a main process to be conducted by the CPU 71 in the printing apparatus 1 will be described. The main process (see FIG. 7) may be activated by the CPU 71 when the printing apparatus 1 is powered on and executed based on a program in the ROM 72. When executing the main process, the CPU 71 displays an editor screen 51 (see FIG. 8), through which a user may enter or edit text including at least one character, in the display 5. Each character being displayed in the editor screen 51 has settings of a language, a typestyle, and a character code, applied thereto. A typestyle already applied to the character may be changed in a typestyle setting process (see FIG. 14), which will be described later in detail.

Figure 7:
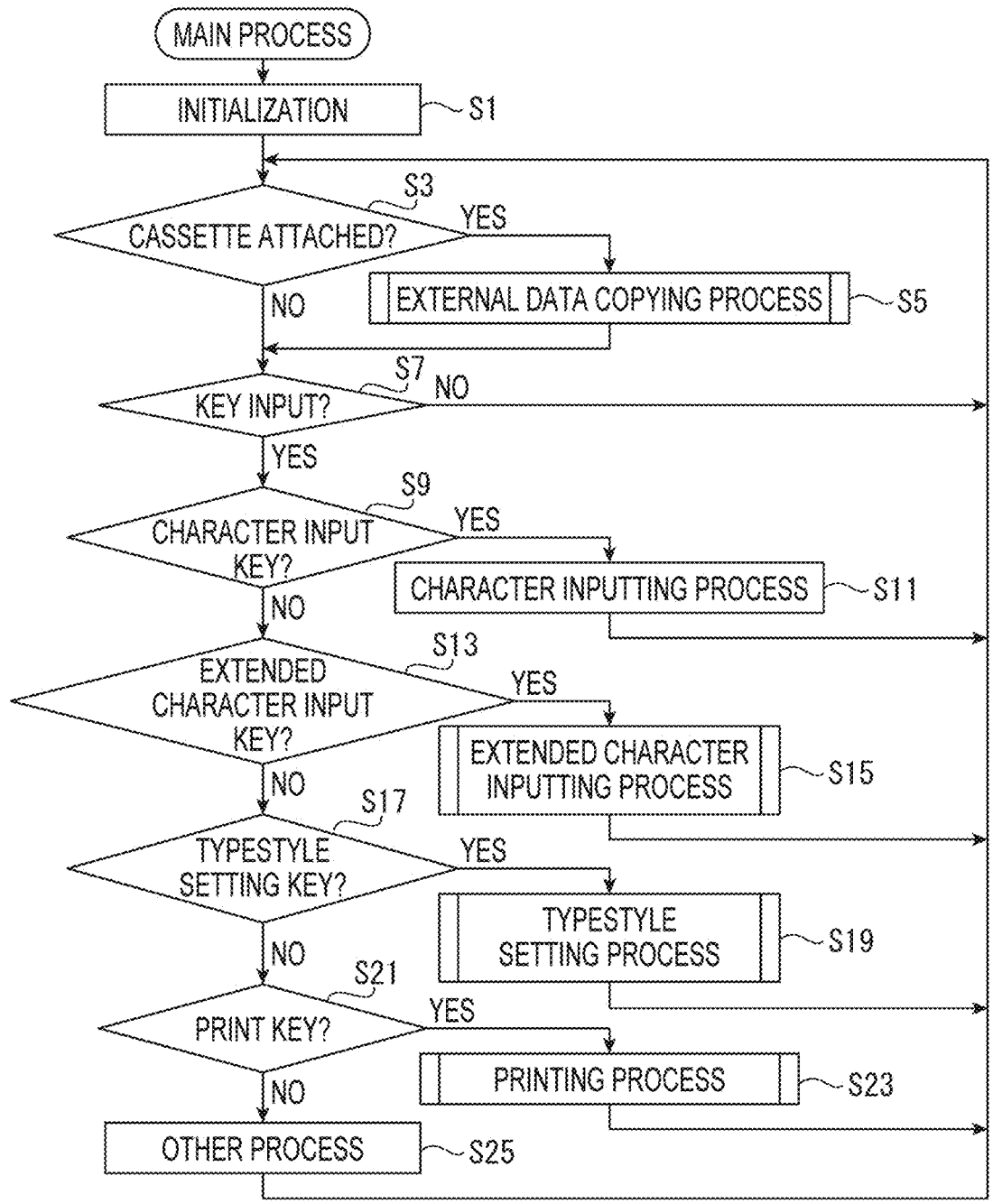
FIG. 7 is a flowchart to illustrate a main process to be conducted in the printing apparatus according to the embodiment of the present disclosure.
Figure 8:
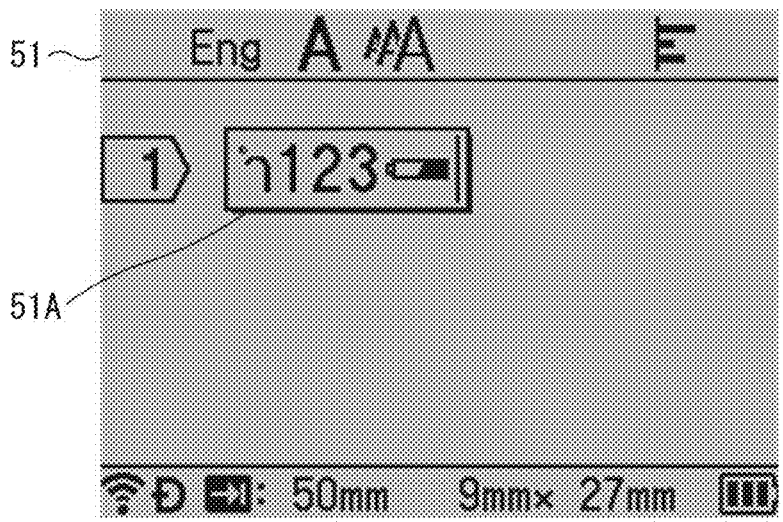
FIG. 8 is an illustrative view of an editor screen in the printing apparatus according to the embodiment of the present disclosure.

As shown in FIG. 7, in the main process, in S1, the CPU 71 executes a predetermined initialization process, in which, for example, the RAM 74 may be cleared. In S3, the CPU 71 determines whether the tape cassette 30 is attached to the attachable section 8. The CPU 71 may, for example, determine that the tape cassette 30 is attached to the attachable section 8 based on output from a detection switch (not shown) located in the attachable section 8. If the tape cassette 30 is attached to the attachable section 8 (S3: YES), in S5, the CPU 71 executes an external data copying process, which will be described later in detail.

If no tape cassette 30 is attached to the attachable section 8 (S3: NO), or following S5, in S7, the CPU 71 determines whether there is any key input is made through the keyboard 3. If any input is entered through the keyboard 3, the CPU 71 determines that the key input is made (S7: YES), and in S9, the CPU 71 determines whether the key, through which the key input was made, is a character input key. The character input key is a key to input a character that belongs to the operable language in the printing apparatus 1.

If the key operated in S7 is a character input key (S9: YES), in S11, the CPU 71 executes a character inputting process to input a character corresponding to the key in the editor screen 51. In particular, the CPU 71 displays an image of the character corresponding to the key in dots according to the display-form data for the character based on either the built-in font 81 or the in-apparatus stored data 80 in the operable language.

If the key operated to make the key input is not a character input key (S9: NO), in S13, the CPU 71 determines whether the key operated to make the key input was an extended character input key. The extended character input key is a key to input an extended character belonging to a language which is different from the operable language in the printing apparatus 1. If the key operated to make the key input is an extended character input key (S13: YES), in S15, the CPU 71 executes an extended character inputting process, which will be described later in detail. If the key operated to make the input is not an extended character input key (S13: NO), in S17, the CPU 71 determines whether the key operated to made the input is a typestyle setting key. The typestyle setting key is a key to apply a typestyle to a character input through the editor screen 51. If the key operated to make the key input is the typestyle setting key (S17: YES), in S19, the CPU 71 executes a typestyle setting process, which will be described later in detail.

If the key operated to make the key input is not the typestyle setting key (S17: NO), in S21, the CPU 71 determines whether the key operated to make the key input is a print key. The print key is a key to command the printing apparatus 1 to execute a printing process to print the text edited through the editor screen 51. If the key operated to make the key input is the print key (S21: YES), in S23, the CPU 71 executes the printing process, which will be described later in detail. If the key operated to make the input is not the print key (S21: NO), in S25, the CPU 71 executes a process corresponding to the operated key. If no key input was made in S7 (S7: NO), or following any one of S11, S15, S19, S23, S25, the CPU 71 returns to S3.

The external data copying process in S5 will be described below with reference to FIG. 9. In the external data copying process, the CPU 71 may manipulate the data reader/writer 16 to access the IC tag 47 in the attached tape cassette 30 and obtain each one of the plurality of units of in-cassette external data 83 to set as process-object data consecutively. The obtained unit of in-cassette external data 83 being the process-object data is processed consecutively in a flow of steps described below. In particular, the CPU 71 reads each unit of the in-cassette external data 83, and when the in-cassette external data 83 satisfies predetermined conditions, the unit of in-cassette external data 83 is copied and stored in the flash memory 75.

Figure 9:
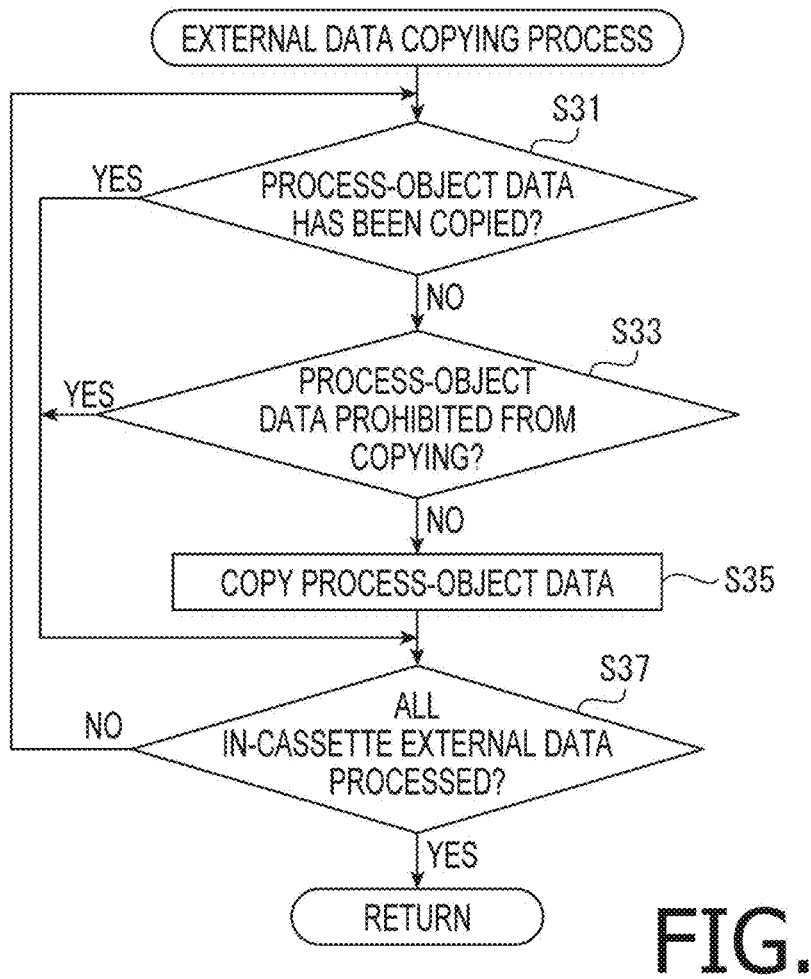
FIG. 9 is a flowchart to illustrate an external data copying process to be conducted in the printing apparatus according to the embodiment of the present disclosure.

More specifically, as shown in FIG. 9, in S31, the CPU 71 determines whether process-object data has been copied already. The CPU 71 may determine that the process-object data has been copied already when a unit of in-apparatus external data 82 corresponding to the process-object data is stored in the flash memory 75 (S31: YES). The CPU 71 proceeds to S37.

If the process-object data has not been copied yet (S31: NO), in S33, the CPU 71 determines whether the process-object data is prohibited from being copied. The CPU 71 may determine that the process-object data is prohibited from being copied when the copy-prohibition information in the process-object data indicates the prohibition flag being "on" (S33: YES). The CPU 71 proceeds to S37. If the process-object data is not prohibited from copying (S33: NO), in S35, the CPU 71 copies the process-object data and stores the copied data in the printing apparatus 1.

Specifically, in S35, the CPU 71 extracts the language information, the typestyle information, the code information, the display-form data in a display-adapted format, and the print-form data in a resolution-adapted format from the IC tag 47 and store in the flash memory 75 as a new unit of in-apparatus external data 82. The display-form data in the display-adapted format is one of the plurality of units of display-form data contained in the process-object data which corresponds to the display size information in the ROM 72. The print-form data in the resolution-adapted format is one of the plurality of units of print-form data contained in the process-object data which corresponds to the print resolution information in the ROM 72.

Meanwhile, the flash memory 75 may store units of in-apparatus external data 82 until a total data volume of the in-apparatus external data 82 or a total number of the units of the in-apparatus external data 82 reaches a predetermined upper limit level. When the total data volume of the in-apparatus external data 82 or the total number of the units of the in-apparatus external data 82 reaches the predetermined upper limit level, the CPU 71 may end the external data copying process to restrain the process-object data from copying and return to the main process.

In S37, the CPU 71 determines whether all units of the in-cassette external data 83 in the IC tag 47 have been obtained as process-object data and processed through S31-S35. If an unprocessed unit of the in-cassette external data 83 remains in the IC tag 47 (S37: NO), the CPU 71 returns to S31 and obtains another unit of in-cassette external data 83 to set as the process-object data. When all units of the in-cassette external data 83 have been processed through S31-S35 (S37: YES), the CPU 71 returns to the main process. Thus, the units of in-cassette external data 83 adapted to the print resolution and the displayable condition in the printing apparatus 1 are copied from the IC tag 47 to be stored in the printing apparatus 1.

Figure 10:
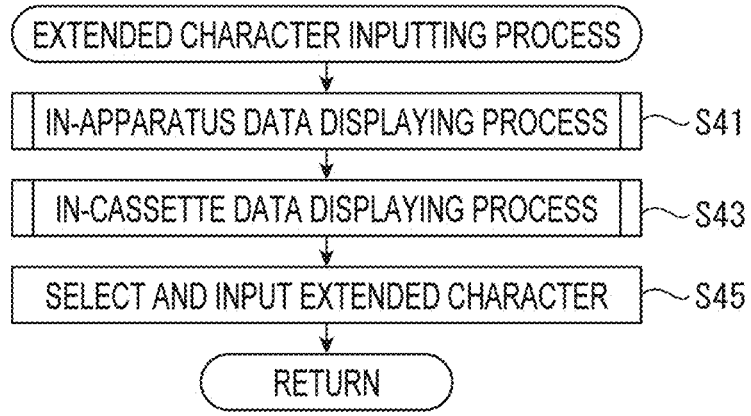
FIG. 10 is a flowchart to illustrate an extended character inputting process to be conducted in the printing apparatus according to the embodiment of the present disclosure.

In S15 (see FIG. 7), the CPU 71 executes the extended character inputting process as shown in FIG. 10. The CPU 71 displays an extended character inputting screen 52 (see FIG. 13), which will be described later in detail, in the display 5 and executes an in-apparatus data displaying process in S41 and an in-cassette data displaying process in S43, which will be described below. In S45, the CPU 71 accepts selection and input of an extended character through the extended character inputting screen 52 and returns to the main process.

Figure 11:
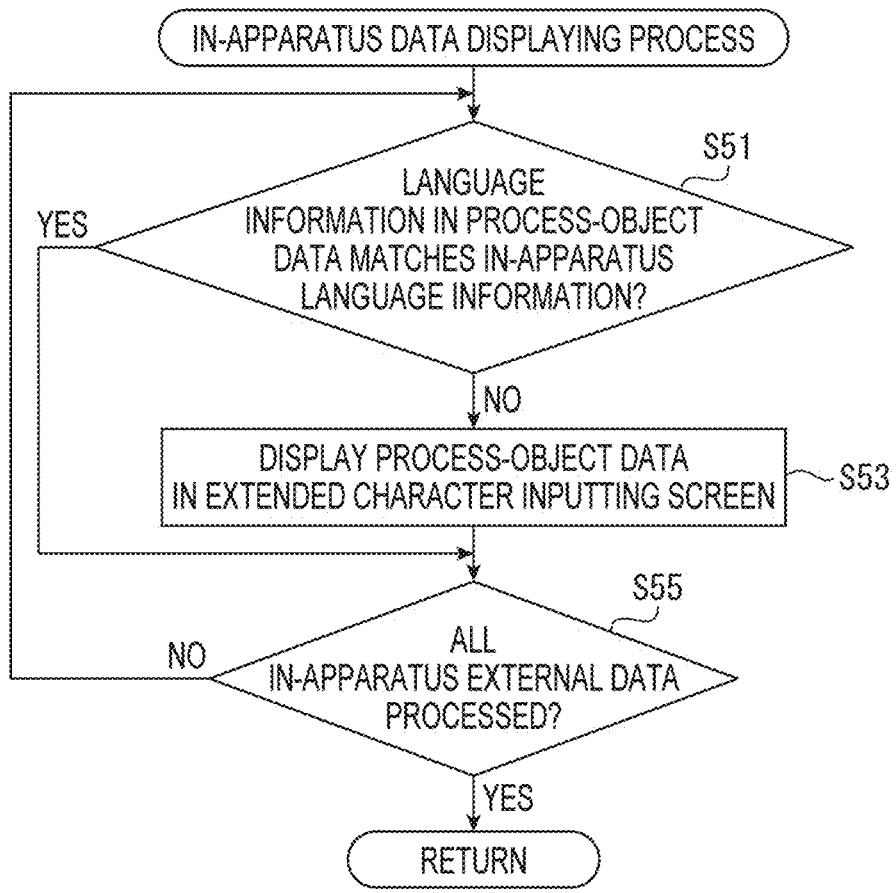
FIG. 11 is a flowchart to illustrate an in-apparatus data displaying process to be conducted in the printing apparatus according to the embodiment of the present disclosure.

In S41, the CPU 71 executes the in-apparatus data displaying process shown in FIG. 11. The CPU 71 obtains each one of the plurality of units of in-apparatus external data 82 from the flash memory 75 to set as process-object data to process consecutively in the following steps. That is, in S51, the CPU 71 determines whether the language information in the process-object data matches the in-apparatus language information stored in the ROM 72. If the language information in the process-object data does not match the in-apparatus language information (S51: NO), in S53, the CPU 71 displays a character corresponding to the process-object data in the extended character inputting screen 52. In particular, the CPU 71 displays an extended character in dots based on the display-form data in the process-object data.

Following S53, or if the language information in the process-object data matches the in-apparatus language information (S51: YES), in S55, the CPU 71 determines whether all units of the in-apparatus external data 82 have been obtained as process-object data and processed through S51-S53. If an unprocessed unit of in-apparatus external data 82 remains in the flash memory 75 (S55: NO), the CPU 71 obtains another unit of in-apparatus external data 82 from the flash memory 75 as new process-object data and returns to S51. If all units of in-apparatus external data 82 have been obtained as process-object data and processed through S51-S53 (S55: YES), the CPU 71 returns to the main process. Thus, an extended character operable in the printing apparatus 1 may be displayed in the extended character inputting screen 52 based on the in-apparatus external data 82, among the plurality of units of the in-apparatus external data 82 stored in the printing apparatus 1, which does not correspond to the in-apparatus language information.

Figure 12:
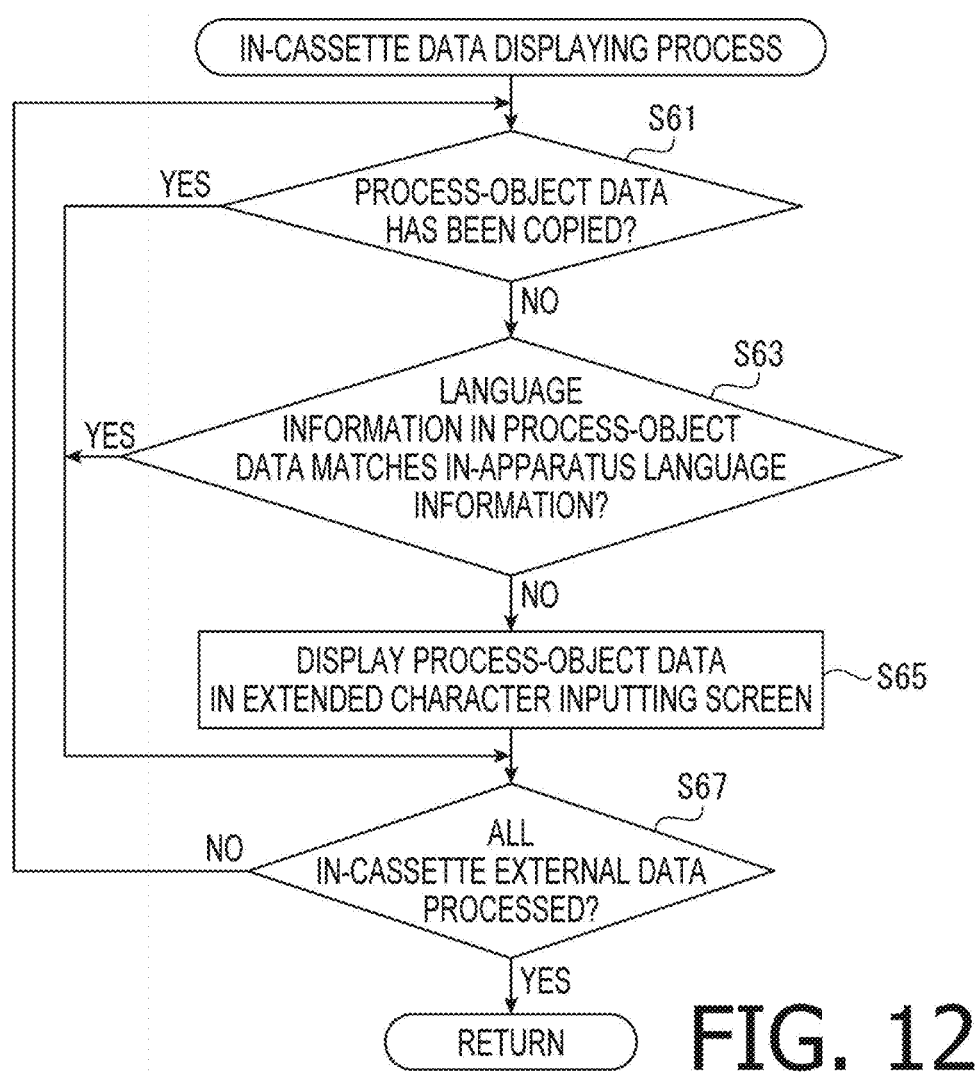
FIG. 12 is a flowchart to illustrate in-cassette data displaying process to be conducted in the printing apparatus according to the embodiment of the present disclosure.

In S43 in the extended character inputting process (see FIG. 10), the CPU 71 executes the in-cassette data displaying process shown in FIG. 12. The CPU 71 obtains, similarly to the external data copying process (see FIG. 9), each one of the plurality of units of in-cassette external data 83 in the IC tag 47 to set as process-object data to process consecutively in the following steps.

In S61, similarly to S31, the CPU 71 determines whether the obtained process-object data has been copied to be stored in the flash memory 75 already. If the process-object data has not been copied yet (S61: NO), in S63, similarly to S51 (see FIG. 11), the CPU 71 determines whether the language information in the process-object data matches the in-apparatus language information stored in the ROM 72. If the language information in the process-object data does not match the in-apparatus language information (S63: NO), in S65, similarly to S53 (see FIG. 11), the CPU 71 displays a character corresponding to the process-object data in the extended character inputting screen 52.

Following S65, in S67, the CPU 71 determines whether all units of the in-cassette external data 83 have been obtained to be process-object data and processed through S61-S65. Meanwhile, in S61 if the process-object data has been copied (S61: YES), or in S63 if the language information in the process-object data matches the in-apparatus language information (S63: YES), the CPU 71 proceeds to S67 and determines whether all units of the in-cassette external data 83 have been obtained to be process-object data and processed through S61-S65 as well. If an unprocessed unit of the in-cassette external data 83 remains in the IC tag 47 (S67: NO), the CPU 71 obtains another unit of in-cassette external data 83 from the IC tag 47 as a new unit of process-object data and returns to S61.

If all units of the in-cassette external data 83 have been obtained as process-object data and processed through S61-S65 (S67: YES), the CPU 71 returns to the main process. Thus, an extended character operable in the printing apparatus 1 may be displayed in the extended character inputting screen 52 based on the in-cassette external data 83, among the plurality of units of the in-cassette external data 83 stored in the tape cassette 30, which does not correspond to the in-apparatus language information.

Figure 13:
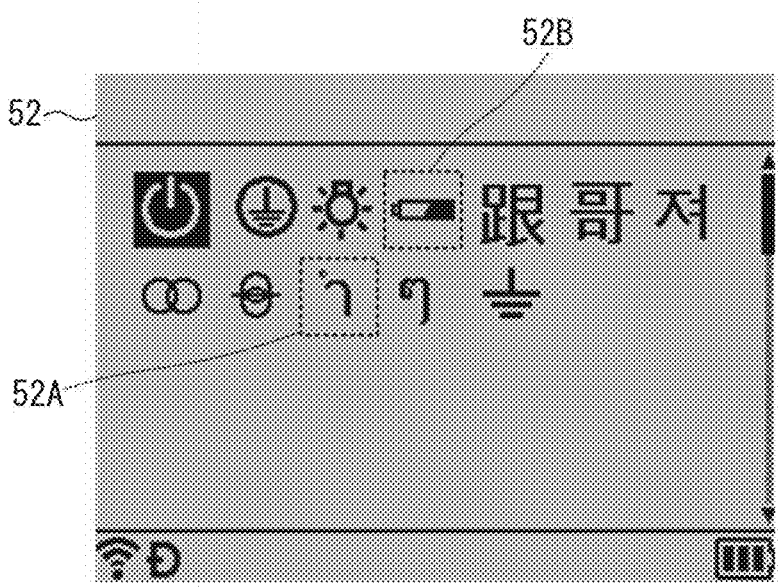
FIG. 13 is an illustrative view of an extended character inputting screen in the printing apparatus according to the embodiment of the present disclosure.

The extended characters displayed through the in-apparatus data displaying process in S41 and through the in-cassette data displaying process in S43 are displayed collectively in the extended character inputting screen 52, as shown in FIG. 13, to be selectable to the user. The user may operate the keyboard 3 to select one of the extended characters through extended character inputting screen 52. In S45, the CPU 71 inputs the selected extended character in the editor screen 51, which is displayed in the display 5.

Figure 14:
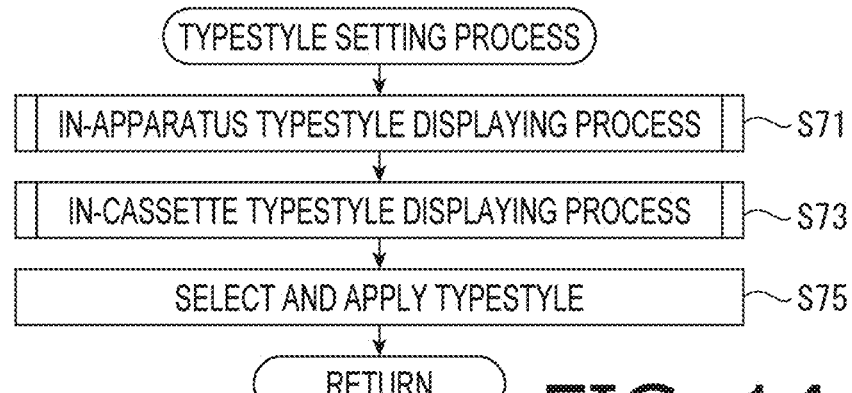
FIG. 14 is a flowchart to illustrate a typestyle setting process to be conducted in the printing apparatus according to the embodiment of the present disclosure.

In S19 in the main process (see FIG. 7), the CPU 71 executes the typestyle setting process shown in FIG. 14. The CPU 71 displays a typestyle option list 53 (see FIG. 17), which will be described later in detail, in the display 5 and executes an in-apparatus typestyle displaying process in S71 and an in-cassette typestyle displaying process in S73, which will be below. Further, the CPU 71 selects a typestyle from the typestyle option list 53 and apply the typestyle to a character input through the editor screen 51. The CPU 71 thereafter returns to the main process.

Figure 15:
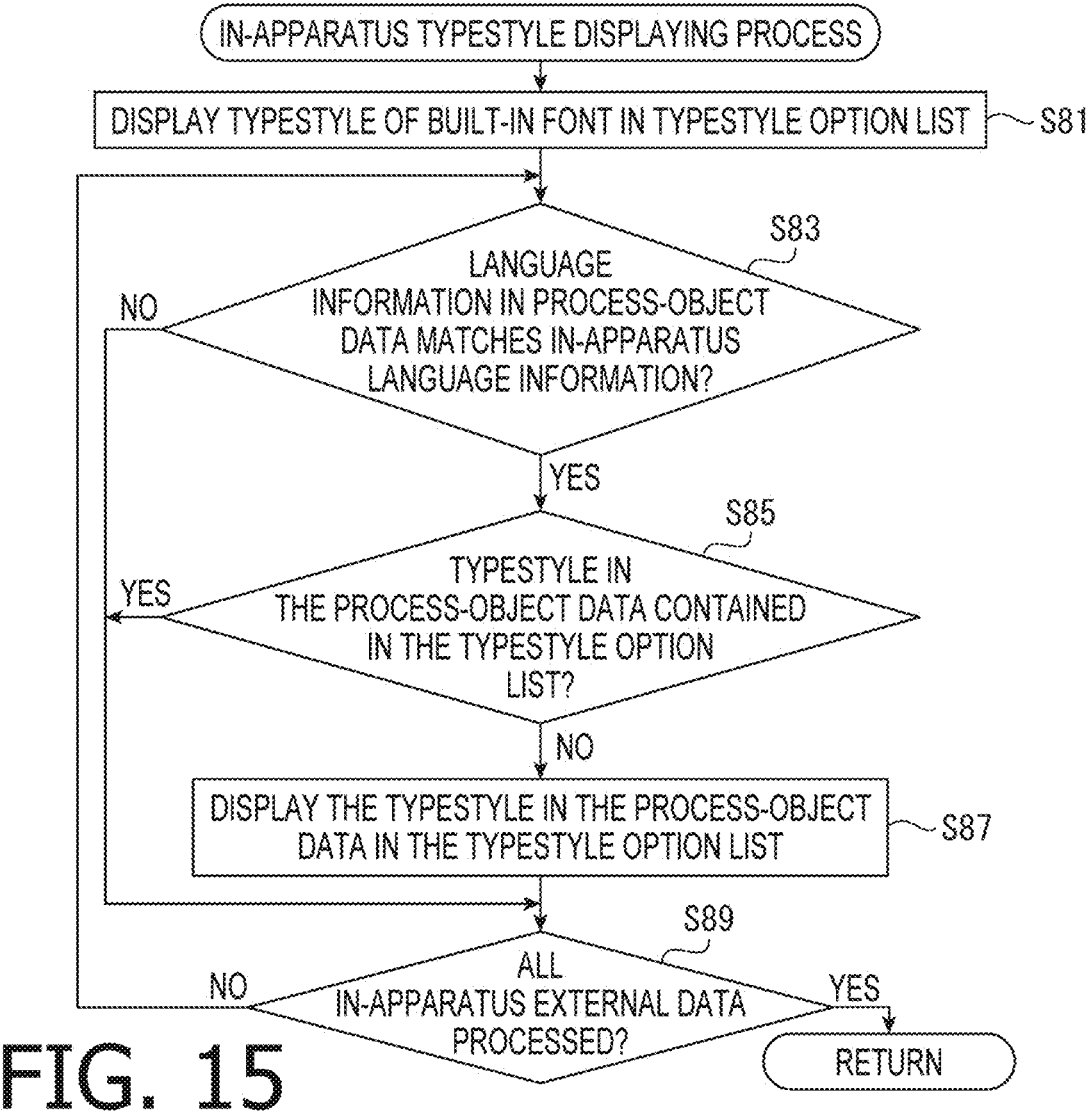
FIG. 15 is a flowchart to illustrate an in-apparatus typestyle displaying process to be conducted in the printing apparatus according to the embodiment of the present disclosure.

In the in-apparatus typestyle displaying process in S71, as shown in FIG. 15, the CPU 71 obtains each one of the plurality of units of in-apparatus external data 82 from the flash memory 75 to set as process-object data to process consecutively in the following steps. That is, in S81, based on the plurality of built-in fonts 81 stored in the CGROM 73, the CPU 71 displays typestyles contained in the built-in fonts 81 in the typestyle option list 53.

Next, in S83, the CPU 71 determines, similarly to S51 (see FIG. 11), the CPU 71 determines whether the language information in the process-object data matches the in-apparatus language information stored in the ROM 72. If the language information in the process-object data matches the in-apparatus language information (S83: YES), in S85, the CPU 71 determines, based on the typestyle information in the process-object data, whether the typestyle contained in the process-object data is included in the typestyle option list 53. If the typestyle contained in the process-object data is not included in the typestyle option list 53 (S85: NO), in S87, the CPU 71 displays the typestyle contained in the process-object data in the typestyle option list 53.

Next, in S89, the CPU 71 determines whether all units of the in-apparatus external data 82 have been obtained to be process-object data and processed through S83-S87. Meanwhile, if the language information in the process-object data does not match the in-apparatus language information (S83: NO), or if the typestyle contained in the process-object data is included in the typestyle option list 53 (S85: YES), the CPU 71 executes S89 as well. If the CPU 71 determines that an unprocessed unit of the in-apparatus external data 82 remains in the flash memory 75 (S89: NO), the CPU 71 obtains another unit of in-apparatus external data 82 from the flash memory 75 as new process-object data and returns to S83. If all units of the in-apparatus external data 82 have been obtained to be process-object data and processed through S83-S87 (S89: YES), the CPU 71 returns to the main process. Thus, the typestyles usable in the printing apparatus 1 may be presented in the typestyle option list 53 based on the built-in fonts 81 in the printing apparatus 1 and the in-apparatus external data 82 corresponding to the in-apparatus language information.

Figure 16:
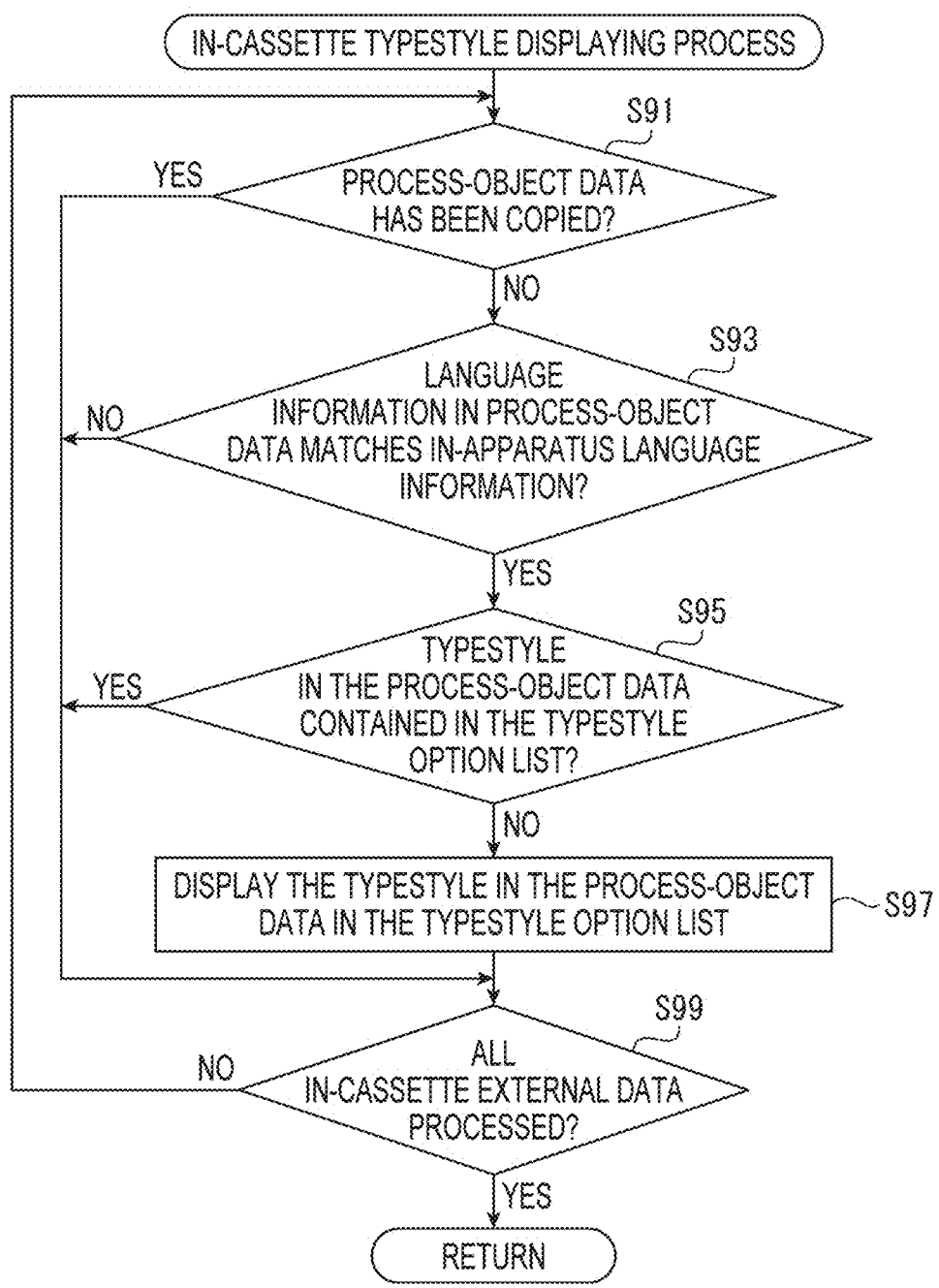
FIG. 16 is a flowchart to illustrate an in-cassette typestyle displaying process to be conducted in the printing apparatus according to the embodiment of the present disclosure.

In the in-cassette typestyle displaying process in S73, as shown in FIG. 16, the CPU 71 obtains each one of the plurality of units of in-cassette external data 83 from the IC tag 47 to set as process-object data to process consecutively in the following steps. That is, in S91, similarly to S61, the CPU 71 determines whether the obtained process-object data has been copied to be stored in the flash memory 75 already. If the process-object data has not been copied yet (S91: NO), in S93, similarly to S63, the CPU 71 determines whether the language information in the process-object data matches the in-apparatus language information stored in the ROM 72. If the language information in the process-object data matches the in-apparatus language information (S93: YES), the CPU 71 proceeds to S95 and determines, similarly to S85, the CPU 71 determines, based on the typestyle information in the process-object data, whether the typestyle contained in the process-object data is included in the typestyle option list 53. If the typestyle contained in the process-object data is not included in the typestyle option list 53 (S95: NO), in S97, the CPU 71 displays the typestyle contained in the process-object data in the font option list 53.

Next, in S99, similarly to S67, the CPU 71 determines whether all units of the in-cassette external data 83 have been obtained as process-object data and processed through S91-S97. Meanwhile, in S91 if the process-object data has been copied (S91: YES), in S93 if the language information in the process-object data does not match the in-apparatus language information (S93: NO), or in S95 if the typestyle contained in the process-object data is included in the typestyle option list 53 (S95: YES), the CPU 71 executes S99 as well. If the CPU 71 determines that an unprocessed unit of the in-cassette external data 83 remains (S99: NO), the CPU 71 obtains another unit of in-cassette external data 83 from the IC tag 47 as a new unit of process-object data and returns to S91.

If all units of the in-cassette external data 83 have been obtained as process-object data and processed through S91-S97 (S99: YES), the CPU 71 returns to the main process. Thus, the typestyles usable in the printing apparatus 1 may be presented in the typestyle option list 53 based on the in-cassette external data 83, among the plurality of units of in-cassette external data 83 stored in the tape cassette 30, which has not been copied in the printing apparatus 1 but corresponds to the in-apparatus language.

Figure 17:
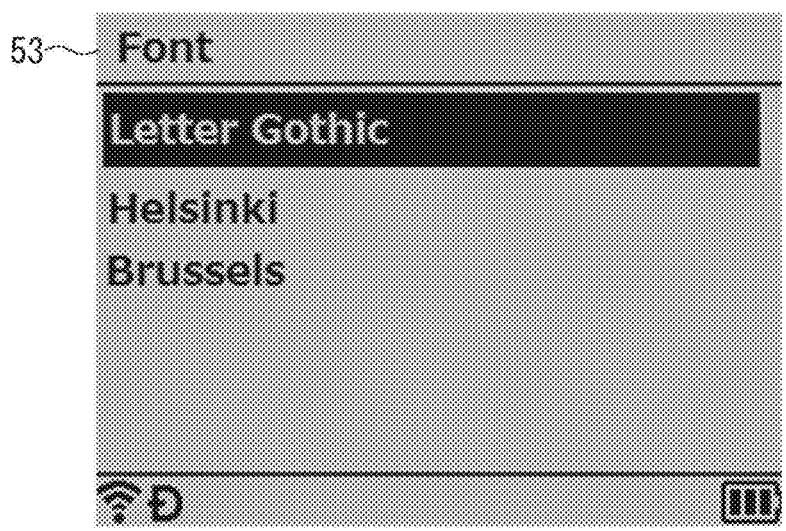
FIG. 17 is an illustrative view of a typestyle option list in the printing apparatus according to the embodiment of the present disclosure.

The typestyles displayed through the in-apparatus font displaying process in S71 and through the in-cassette font displaying process in S73 are displayed collectively in the typestyle option list 53, as shown in FIG. 17, to be applicable to a character included in the text, and the user may select one of the listed typestyles from the typestyle option list 53 through the keyboard 3. In S75, the CPU 71 applies the applicable typestyle selected by the user to the character specified in the editor screen 51, which is displayed in the display 5.

Figure 18A:
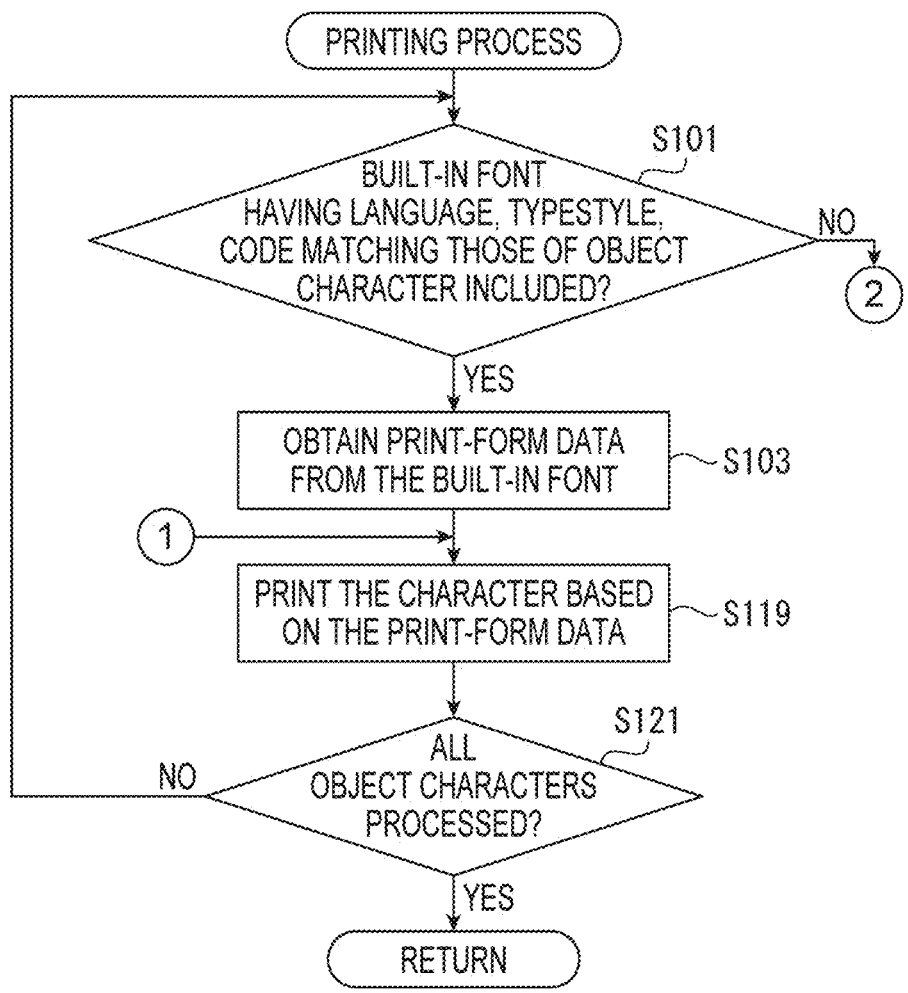
FIGS. 18A-18B are a flowchart to illustrate a printing process to be conducted in the printing apparatus according to the embodiment of the present disclosure.
Figure 18B:
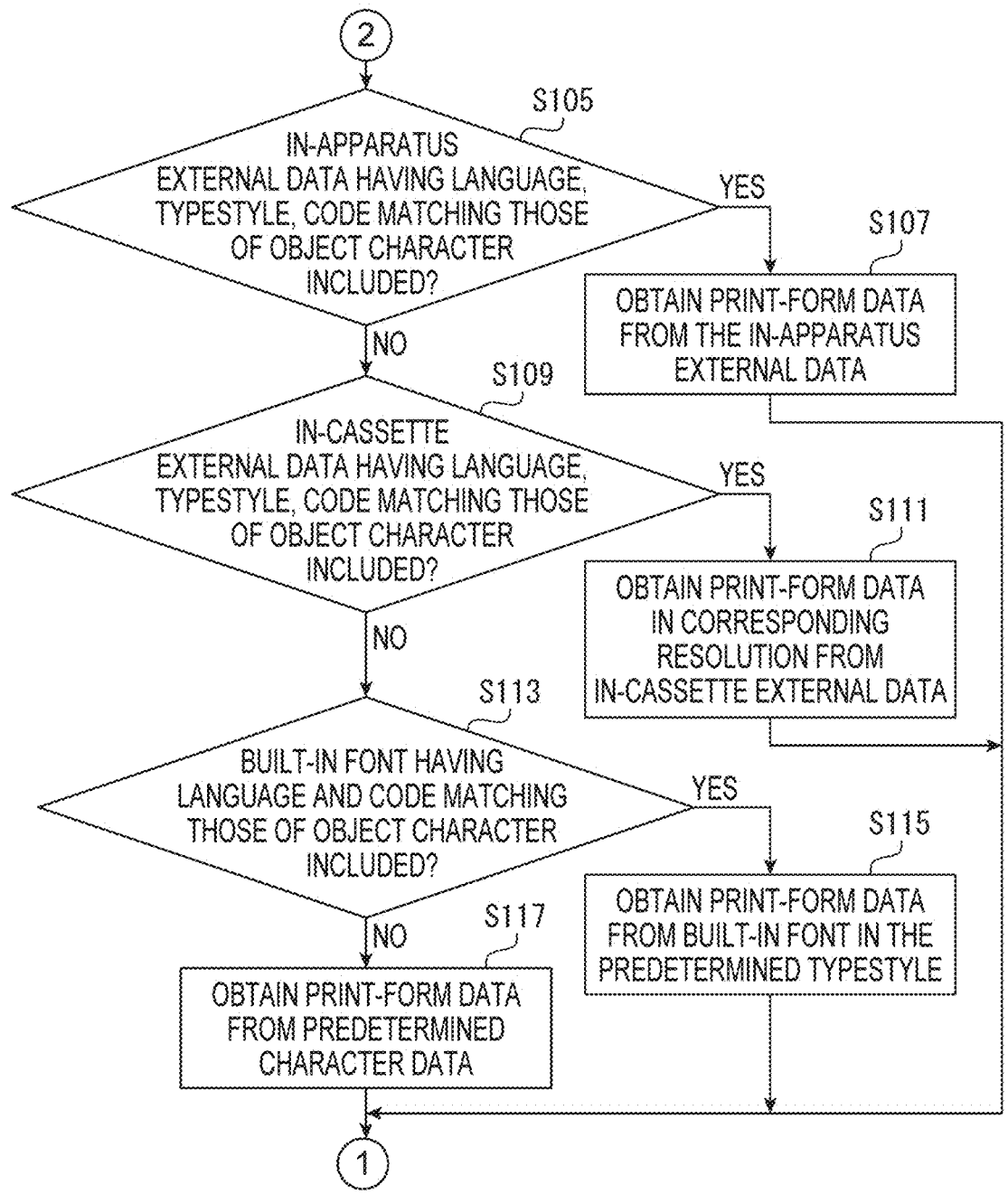

In S23 in the main process (see FIG. 7), the CPU 71 executes the printing process shown in FIG. 18. As shown in FIG. 18, the CPU 71 obtains each one of the characters in the text edited through the editor screen 51 to set as an object character to process consecutively in the following steps. That is, in S101, the CPU 71 searches through the built-in fonts 81 stored in the CGROM 73 for a specific built-in font 81. In particular, the CPU 71 determines, based on the language information, the typestyle information, and the code information contained in the built-in fonts 81, whether the built-in fonts 81 include a particular built-in font 81, of which language, typestyle, and character code all match the language, the typestyle, and the character code in the object character. If the CPU 71 finds the particular built-in font 81 having the language, the typestyle, and the character code all matching the language, the typestyle, and the character code of the object character (S101: YES), in S103, the CPU 71 appoints the particular built-in font 81 as print-object data and obtains the print-form data from the appointed print-object data.

If the built-in fonts 81 in the CGROM 73 do not include but lack such a built-in font 81 that has a language, a typestyle, and a character code all matching the language, typestyle, and character code of the object character (S101: NO), in S105, the CPU 71 determines, based on the language information, the typestyle information, and the code information contained in the plurality of units of in-apparatus external data 82 stored in the flash memory 75, whether the plurality of units of in-apparatus external data 82 include a particular unit of in-apparatus external data 82, of which language, typestyle, and character code all match the language, the typestyle, and the character code in the object character. If the units of in-apparatus external data 82 include such a unit of in-apparatus external data 82 that has a language, a typestyle, and a character code all matching the, language, the typestyle, and the character code of the object character (S105: YES), in S107, the CPU 71 appoints the particular unit of in-apparatus external data 82 as print-object data and obtains the print-form data from the appointed print-object data.

If the plurality of units of in-apparatus external data 82 in the flash memory 75 lack such a unit of in-apparatus external data 82 that has a language, a typestyle, and a character code all matching the, language, the typestyle, and the character code of the object character (S105: NO), in S109, the CPU 71 determines, based on the language information, the typestyle information, and the code information contained in the plurality of units of in-cassette external data 83 stored in the IC tag 47, whether the units of in-cassette external data 83 include a particular unit of in-cassette external data 83, of which language, typestyle, and character code all match the language, the typestyle, and the character code in the object character. If the units of in-cassette external data 83 include such a unit of in-cassette external data 83 that has a language, a typestyle, and a character code all matching the language, the typestyle, and the character code of the object character (S109: YES), in S111, the CPU 71 appoints the unit of in-cassette external data 83 as print-object data and obtains print-form data in a corresponding resolution among a plurality of units of print-form data contained in the print-object data.

If the plurality of units of in-cassette external data 83 lack such a unit of in-cassette external data 83 that has a language, a typestyle, and a character code all matching the language, the typestyle, and the character code in the object character (S109: NO), in S113, the CPU 71 determines whether the built-in fonts 81 include a particular unit of built-in font 81, of which language and character code both match the language and the character code in the object character. If the built-in fonts 81 include such a particular built-in font 81 that has the language the character code both matching the language and the character code of the object character (S113: YES), in S115, the CPU 71 appoints the particular built-in font 81 in a predetermined typestyle to be the print-object data and obtains the print-form data from the appointed print-object data. The predetermined typestyle may be one of standard typestyles that may be used in character printing, such as, for example, gothic style.

If the built-in fonts 81 lack such a built-in font 81 that has the language and the character code both matching the language and the character code of the object character (S113: NO), in S117, the CPU 71 appoints a predetermined unit of character data as the print-object data and obtains the print-form data from the appointed print-object data. The predetermined unit of character may be a unit of character data, which may be alternatively used when the character data to print the object character correctly is absent, and may include, for example a blank space.

In S119, the CPU 71 manipulates the thermal head 10 to print the character based on the print-form data obtained through any one of S103, S107, S111, S115, and S117 on the tape 50. In particular, when the print-form data is obtained through any one of S103, S107, and S111, the object character is printed in the print dot pattern corresponding to the typestyle applied to the object character. When the print-form data is obtained through S115, the object character is printed in a print dot pattern in the predetermined typestyle, which is different from the typestyle applied to the object character. When the print-form data is obtained through S117, an alternative character different from the object character is printed in a print dot pattern. With regard to the print-form data used in S119, while the print-form data used in S119 corresponds to the print resolution in the printing apparatus 1, the object character may be printed correctly.

In S121, the CPU 71 determines whether all of the object characters in the text edited through the editor screen 51 have been processed through S101-S119. If an unprocessed object character remains (S121: NO), the CPU 71 obtains another unit of data for a next one of the characters in the text to be a new object character and returns to S101. If all of the object characters in the text have been processed (S121: YES), the CPU 71 returns to the main process. Thus, the text edited through the editor screen 51 may be printed on the tape 50 to produce a label with the text printed thereon.

According to the main process described above, a label with a text 51A may be produced in the following procedure. That is, the user may press an extended character input key in the editor screen 51 (see FIG. 8) and select an extended character 52A through the extended character inputting screen 52 (see FIG. 13) (S13: YES, S15). The user may thereafter press the character inputting key to enter standard characters "123" (S9: YES, S11). The user may press the typestyle setting key and select one of the typestyles from the applicable typestyles displayed in the typestyle option list 53 (see FIG. 17) for the characters "123." For example, the user may select "Letter Gothic" style for the characters "123" (S17: YES, S19). Finally, the user may press the extended character inputting key and select an extended character 52B through the extended character inputting screen 52 (S13: YES, S15) to complete editing the text 51A.

After editing the text 51A, the user may press a print key, and a label with the text 51A printed thereon may be produced (S21: YES, S23). On the produced label, the extended character 52A, the standard characters "123," and the extended character 52B drawn in the selected typestyle "Letter Gothic" may be printed in the print dot patterns corresponding to the printable resolution in the printing apparatus 1.

According to the embodiment described above, the tape cassette 30 includes the tape 50 being the print medium and the IC tag 47 to store information to be readable. The IC tag 47 stores specific character data for printing the specific character, which may be expressed in a specific format in compliance with a type or a purpose assigned to the tape cassette 30. Therefore, even when the printing apparatus 1 does not store the character data to be used to print the specific character, the printing apparatus 1 may be enabled to print the specific character using the in-cassette external data 83 provided from the IC tag 47 in the tape cassette 30.

The printing apparatus 1 includes the attachable section 8, to which the tape cassette 30 may be detachably attached, and the internal memory 79 to store the built-in fonts 81 as the in-apparatus stored data 80. The CPU 71 in the printing apparatus 1 may read the in-cassette external data 83 that satisfies the predetermined conditions from the IC tag 47 in the tape cassette 30 being attached to the attachable section 8 and stores the read in-cassette external data 83 in the internal memory 79 as the in-apparatus stored data 80 (S5). The CPU 71 may appoint the print-object data being the character data corresponding to the object character from the in-apparatus stored data 80 stored in the internal memory 79 (S103, S107). The CPU 71 may manipulate the thermal head 10 to print the object character on the tape 50 in the tape cassette 30 being attached to the attachable section 8 based on the appointed print-object data (S119).

Thus, the printing apparatus 1 may store the in-cassette external data 83, which is stored in the IC tag 47 in the attached tape cassette 30, in the internal memory 79 as the in-apparatus stored data 80. Therefore, the printing apparatus 1 may print the specific character on the tape 50 based on the in-apparatus stored data 80 stored in the internal memory 79 even if the printing apparatus 1 is not initially equipped with the character data to print the specific character.

The CPU 71 may, when the tape cassette 30 is attached to the attachable section 8, and when no print-object data is included in the in-apparatus stored data 80, appoint the print-object data from external data, which is stored in the IC tag 47 but is not stored in the internal memory 79 (S111). Thus, the printing apparatus 1 may, even when the printing apparatus 1 is not initially equipped with the character data to print the specific character in the internal memory 79, print the specific character on the tape 50 based on the in-cassette external data 83 stored in the IC tag 47.

The CPU 71 may store non-prohibited data, which is the in-cassette external data 83 stored without setting of the prohibition flag in the IC tag 47, in the internal memory 79 as the in-apparatus stored data 80 (S33: NO, S35). Thus, for example, the in-cassette external data 83 that contains confidential information or the in-cassette external data 83 that is limitedly open to authorized personnel may be prevented from being copied to be stored in the printing apparatus 1. Meanwhile, the non-prohibited data stored in the IC tag 47 may be used in the printing apparatus 1 only when the tape cassette 30 is attached to the attachable section 8.

The CPU 71 may, when the total data volume or the total number of the data units of the in-cassette external data 83 stored in the internal memory 79, i.e., the in-apparatus external data 82, reaches a predetermined upper limit level, restrain the unprocessed data, which is the in-cassette external data 83 stored in the IC tag 47 but not stored in the internal memory 79, from being stored in the internal memory 79. Thus, the in-cassette external data 83 may be prevented from being copied to be stored in the printing apparatus 1 beyond the storable data volume in the internal memory 79.

The CPU 71 may, in response to a command from the user to input an extended character, control the display 5 to display the character corresponding to the extended character to be selectable to the user based on the character data, which includes the language information indicating a language different from the operable language of the printing apparatus 1, among the in-apparatus stored data 80 stored in the internal memory 79 (S65). Therefore, the printing apparatus 1 may allow the user to select an extended character based on the in-apparatus stored data 80 which does not correspond to the operable languages in the printing apparatus 1.

The CPU 71 may, in response to a command from the user to apply a typestyle to the character, control the display 5 to display applicable typestyles to be selectable to the user based on the character data, which includes the language information indicating the operable language of the printing apparatus, among the in-apparatus stored data 80 stored in the internal memory 79 (S87). Therefore, the printing apparatus 1 may allow the user to select a typestyle to be applied to the character based on the in-apparatus stored data 80 corresponding to the operable languages.

The CPU 71 may, when the internal memory 79 lacks the in-apparatus stored data 80, of which language information, typestyle information, and character code match the language information, the typestyle information, and the character code of the object character, appoint a unit of the in-apparatus stored data 80, of which language information and character code match the language information and the character code of the object character, to be the print-object data (S115). The CPU 71 may manipulate the thermal head 10 to print the object character in the typestyle indicated in the typestyle information included in the appointed print-object data (S119). Thus, for example, when text with a specific typestyle applied thereto is printed, some of the characters included in the text may not have the in-apparatus stored data 80 for the applied typestyle. Even in such an occasion, the printing apparatus 1 may print the characters in an alternative typestyle.

Although an example of carrying out the invention has been described, those skilled in the art will appreciate that there are numerous variations and permutations of the printing apparatus and the tape cassette that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the built-in fonts 81 and the in-cassette external data 83 may not necessarily be stored in different storage devices, e.g., the CGROM 73 and the flash memory 75, but may be stored in a same storage device. For another example, the external data copying process (see FIG. 9) may be activated automatically when the tape cassette 30 is attached to the attachable section 30 or may be activated when a user's command to copy the external data is entered.

For another example, in S35 (see FIG. 9), the CPU 71 may not necessarily extract the language information, the typestyle information, the code information, the display-form data in a display-adapted format, and the print-form data in a resolution-adapted format from the in-cassette external data 83 in the IC tag 47 but may copy the in-cassette external data 83 being the process-object data entirely and store in the printing apparatus 1 as the in-apparatus external data 82. In this way, the in-apparatus external data 82 may, similarly to the in-cassette external data 83, include a plurality of units of display-form data and a plurality of units of the print-form data (see FIG. 5). The CPU 71 may display a character based on one of the plurality of units of display-form data in the display-adapted format included in the in-apparatus external data 82 and print the character based on the display-form data in the resolution-adapted format included in the in-apparatus external data 82.

What is claimed is:

1. A printing apparatus configured to print characters in conjunction with a tape cassette, the tape cassette comprising a tape being a printing medium and a first memory device configured to store information including character data being data units for printing the characters on the tape, the character data including specific character data for printing a which is expressed in a specific format, the character data including language information and typestyle information, the specific character data being the language information indicating a language, to which each of the characters belongs, and the typestyle information indicating a typestyle applied to each of the characters, the printing apparatus comprising:
    an attachable section, to which the tape cassette is detachably attached;
    a second memory device configured to store built-in data being the character data for printing the character in a predetermined format as in-apparatus stored data;
    a printer;
    a display; and
    a controller configured to:
        read the specific character data that satisfies a predetermined condition from the first memory device in the tape cassette being attached to the attachable section and store the read specific character data in the second memory device as the in-apparatus stored data;
        determine whether the character data corresponding to an object character is included in the in-apparatus stored data stored in the second memory device, the object character being one of the characters appointed as a print object;
        appoint, based on a determination that the character data corresponding to the object character is included in the in-apparatus stored data, the character data corresponding to the object character included in the in-apparatus stored data as print-object data;
        print, by the printer, the object character on the tape in the tape cassette being attached to the attachable section based on the appointed print-object data;
        edit text, the text including the characters, according to an operation of a user through an editor screen displayed in the display;
        control, in response to a command from the user to input one of extended characters through the editor screen, the display to display a part of the characters corresponding to the extended characters to be selectable to the user based on first-typed language-indicative data in the character data among the in-apparatus stored data stored in the second memory device, the first-typed language indicative data including the language information that indicates a language different from an operable language of the printing apparatus; and
        control, in response to a command from the user to apply a typestyle to one of the part of the characters through the editor screen, the display to display at least one applicable typestyle, the applicable typestyle being the typestyle applicable to the one of the part of the characters included in the text, to be selectable to the user based on second-typed language-indicative data among the in-apparatus stored data stored in the second memory device, the second-typed language-indicative data including the language information that indicates the operable language of the printing apparatus.

2. The printing apparatus according to claim 1,
    wherein the controller is further configured to:
        obtain, based on determinations that the tape cassette is attached to the attachable section and that the in-apparatus stored data does not include the character data corresponding to the object character, the character data corresponding to the object character from external data, the external data being the specific character data stored in the first memory device but not stored in the second memory device; and
        appoint the obtained character data corresponding to the object character as the print-object data.

3. The printing apparatus according to claim 2,
    wherein the first memory device in the tape cassette is configured to store a prohibition flag, the prohibition flag being a unit of information set to the specific character data to prohibit the specific character data from being stored in a memory device different from the first memory device,
    wherein the controller is further configured to store non-prohibited data, the non-prohibited data being the specific character data stored without setting of the prohibition flag in the first memory device, in the second memory device as the in-apparatus stored data.

4. The printing apparatus according to claim 2,
    wherein the controller is further configured to restrain, based on a determination that one of a total data volume of the specific character data or a total number of the data units of the specific character data stored in the second memory device reaches a predetermined upper limit level, unprocessed data from being stored in the second memory device, the unprocessed data being the specific character data stored in the first memory device but not stored in the second memory device.

5. The printing apparatus according to claim 1,
    wherein the character data includes a character code to identify each of the characters,
    wherein the controller is further configured to:
        appoint, based on a determination that the second memory device lacks language information, typestyle information, and character code, which are included in the in-apparatus stored data read from the first memory device, that match the language information, the typestyle information, and the character code of the object character, the built-in data, of which language information and character code match the language information and the character code of the object character, as the print-object data; and
        print, by the printer, the object character in the typestyle indicated in the typestyle information included in the built-in data appointed as the print-object data.

6. The printing apparatus according to claim 1,
wherein a type is assigned to the cassette tape, and
wherein the specific format is compliant with the type assigned to the tape cassette.

7. The printing apparatus according to claim 1,
wherein a purpose is assigned to the cassette tape, and
wherein the specific format is compliant with the purpose assigned to the tape cassette.

8. A printing apparatus configured to print characters in conjunction with a tape cassette, the tape cassette comprising a tape being a printing medium and a first memory device configured to store information including character data being data units for printing the characters on the tape, the character data including specific character data and language information, the specific character data being for printing a specific character which is expressed in a specific format, and the language information indicating a language, to which each of the characters belongs, the printing apparatus comprising:
  an attachable section, to which the tape cassette is detachably attached;
  a second memory device configured to store built-in data being the character data for printing the characters in a predetermined format as in-apparatus stored data;
  a printer;
  a display; and
  a controller configured to:
    read the specific character data that satisfies a predetermined condition from the first memory device in the tape cassette being attached to the attachable section;
    determine whether the character data corresponding to an object character is included in one of the first memory device or the second memory device, the object character being one of the characters appointed as a print object;
    appoint, based on a determination that the character data corresponding to the object character is included in one of the first memory device or the second memory device, the character data corresponding to the object character included in the one of the first memory device or the second memory device as print-object data;
    print, by the printer, the object character on the tape in the tape cassette being attached to the attachable section based on the appointed print-object data;
    edit text, the text including the characters, according to an operation of a user through an editor screen displayed in the display; and
    control, in response to a command from the user to input one of extended characters through the editor screen, the display to display a part of the characters corresponding to the extended characters to be selectable to the user based on language-indicative data in the character data included in the one of the first memory device or the second memory device, the language indicative data including the language information that indicates a language different from an operable language of the printing apparatus.

9. The printing apparatus according to claim 8,
wherein the controller is further configured to:
  store the specific character data in the second memory device as the in-apparatus stored data, the specific character data being read from the first memory device; and
  control, in response to the command from the user to input the one of extended characters through the editor screen, the display to display the part of the characters corresponding to the extended characters to be selectable based on the language-indicative data in the character data among the in-apparatus stored data stored in the second memory device.

10. A printing apparatus configured to print characters in conjunction with a tape cassette, the tape cassette comprising a tape being a printing medium and a first memory device configured to store information including character data being data units for printing the characters on the tape, the character data including specific character data, language information and typestyle information, the specific character data being for printing a specific character which is expressed in a specific format, the language information indicating a language, to which each of the characters belongs, and the typestyle information indicating a typestyle applied to each of the characters, the printing apparatus comprising:
  an attachable section, to which the tape cassette is detachably attached;
  a second memory device configured to store built-in data being the character data for printing the characters in a predetermined format as in-apparatus stored data;
  a printer;
  a display; and
  a controller configured to:
    read the specific character data that satisfies a predetermined condition from the first memory device in the tape cassette being attached to the attachable section;
    determine whether the character data corresponding to an object character is included in one of the first memory device or the second memory device, the object character being one of the characters appointed as a print object;
    appoint, based on a determination that the character data corresponding to the object character is included in one of the first memory device or the second memory device, the character data corresponding to the object character included in the one of the first memory device or the second memory device as print-object data;
    print, by the printer, the object character on the tape in the tape cassette being attached to the attachable section based on the appointed print-object data; and
    edit text, the text including the characters, according to an operation of a user through an editor screen displayed in the display; and
    control, in response to a command from the user to apply a typestyle to one of a part of the characters through the editor screen, the display to display at least one applicable typestyle, the applicable typestyle being the typestyle applicable to the one of the part of the characters included in the text, to be selectable to the user based on language-indicative data in the character data included in the one of the first memory device or the second memory device, the language-indicative data including the language information that indicates the operable language of the printing apparatus.

11. The printing apparatus according to claim 10,
wherein the controller is further configured to:
  store the specific character data in the second memory device as the in-apparatus stored data, the specific character data being read from the first memory device; and control, in response to the command from the user to apply the typestyle to the one of the part of the characters through the editor screen, the display to display the at least one applicable typestyle to be selectable based on language-indicative data in the character data among the in-apparatus stored data stored in the second memory device.

\* \* \* \* \*